United States Patent Office 3,410,822
Patented Nov. 12, 1968

3,410,822
CARBONYL-CONTAINING ORGANOSILICON
MATERIALS
Edward V. Wilkus, Albany, and Abe Berger, Schenectady,
N.Y., assignors to General Electric Company, a corporation of New York
No Drawing. Continuation-in-part of application Ser. No. 408,367, Nov. 2, 1964. This application Nov. 1, 1966, Ser. No. 591,117
18 Claims. (Cl. 260—46.5)

ABSTRACT OF THE DISCLOSURE

Organosilicon materials, such as monomers and polymers containing chemically combined units selected from

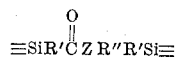

and

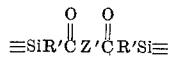

where Z is selected from divalent aryl ether radicals, divalent bis(aryl)sulfone radicals, divalent aryl carbazone radicals and certain divalent heteroaromatic radicals, Z' is selected from Z radicals, divalent aromatic hydrocarbon radicals, and halogenated divalent aromatic hydrocarbon radicals, R' can be divalent hydrocarbon radical and R'' is an alkylene radical. The subject organosilicon materials are useful for making elastomers having reduced swell in fluid hydrocarbons, primers, etc.

---

This application is a continuation-in-part of my copending application Ser. No. 408,367 filed Nov. 2, 1964 now Patent No. 3,301,817 and assigned to the same assignee as the present invention.

The present invention relates to carbonyl-containing organosilicon materials useful for making elastomers having improved resistance to swell in fluid hydrocarbons. More particularly, the present invention relates to a method of acylating an aryl nucleus with certain carboxylic acid halides and to the resulting silicon containing materials obtained therefrom.

The carbonyl-containing organosilicon materials included by the present invention are selected from (A) organosilicon materials of the formula, (1) 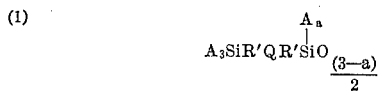

(B) polymers consisting essentially of chemically combined units of the formula, (2) 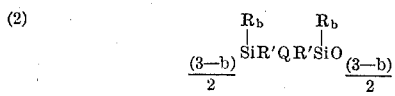

(C) copolymers of from 0.01 to 99.99 mole percent of organosiloxy units of the formula, (3) 

chemically combined with from 99.99 mole percent to 0.01 mole percent of (B) units, and (D) curable compositions comprising (a), a curing agent, and (b) a silanol chain-stopped polymer selected from (i) homopolymers consisting essentially of chemically combined

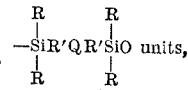 units, (ii) copolymers of from 5 to 95 mole percent of (i) units chemically combined with from 95 to 5 mole percent of organosiloxy units consisting essentially of $R_2SiO$ units, where R is selected from the class consisting of monovalent hydrocarbon radicals, holagenated monovalent hydrocarbon radicals, and cyanoalkyl radicals, R' is selected from the class consisting of divalent hydrocarbon radicals, and halogenated divalent hydrocarbon radicals, A is selected from the class consisting of hydrogen, R radicals, halogen radicals, and alkoxy radicals, Q is a radical selected from the class consisting of

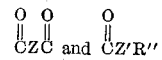

where Z is selected from the class consisting of divalent aromatic hydrocarbon radicals, halogenated divalent aromatic hydrocarbon radicals, divalent aryl ether radicals, divalent bis(aryl)sulfone radicals, divalent aryl carbazone radicals, and divalent heteroaromatic radicals having as the hetero atom a member selected from oxygen, sulfur, phosphorous, and nitrogen, said heteroaromatic radicals being selected from five-membered heterocyclic radicals and heterocyclic radicals which are part of a fused ring structure, Z' is all of the aforementioned Z radicals except divalent aromatic hydrocarbon radicals, and halogenated divalent hydrocarbon radicals, R'' is an alkylene radical, $a$ is an integer equal to 2 to 3, $b$ is a whole number equal to 0 to 2, inclusive, and $c$ is an integer equal to 0 to 3, inclusive, and the sum of $b$ and $c$ in said copolymers of (C) can have a value of from 1 to 2.5, inclusive.

Radicals included by R of the above formula are aryl radicals and halogenated aryl radicals, such as phenyl, chlorophenyl, xylyl, tolyl, etc.; aralkyl radicals, such as phenylethyl, benzyl, etc.; aliphatic radicals, haloaliphatic radicals and cycloaliphatic radicals, such as methyl, ethyl, propyl, butyl, vinyl, and allyl, cyclohexyl, trifluoropropyl, tetrafluorobutyl, etc.; cyanoalkyl, such as cyanoethyl, cyanopropyl, cyanobutyl, etc. Radicals included by R' of the above formula are arylene radicals, halogenated arylene radicals, alkylene radicals, and halogenated alkylene radicals, such as phenylene, tolylene, methylene, ethylene, trimethylene, tetramethylene, pentamethylene, decamethylene, chlorophenylene, etc. Radicals included by Z of the above formula are, for example, phenylene, chlorophenylene, phenyleneoxyphenylene, biphenylene, naphthylene, thienylene, furylene, xanthylene, anthrylene, dixylylsulfone, dibenzofuran, carbazolylene, dibenzothiophene, etc. Radicals included by A are all of the aforementioned R radicals, ethoxy, butoxy, chloro, bromo, etc. Radicals included by R'' are all of the aforementioned alkylene radicals included by R'. In Formulae 1, 2, and 3, where R, R', A, Z, etc. respectively can represent more than one radical, all of these radicals can be the same or a mixture of any two or more of the aforementioned radicals.

Included by the carbonyl-containing organosilicon materials of Formula 1 are for example, bis(gamma-trimethylsilylbutyrylphenyl)ether, bis(gamma - dimethylchlorosilylbutyrylphenyl)ether, bis(beta - trichlorosilylpropionyl)-xanthene, bis(gamma - dimethylmethoxysilylbutyryl)-dibenzofuran, etc. These materials can be employed to make polymers which resist swelling when immersed in hydrocarbon solvents as compared to conventional polydimethylsiloxane. Some of these materials also can be employed as process aids for manufacturing organopolysiloxane elastomers. In addition, some of these carbonyl-containing materials can be employed as primers for bonding plastic materials to metal substrates, as perfume ingredients, oil bases for cosmetics, hair sprays, etc.

The carbonyl-containing organosilicon materials of Formula 1, can be made by acylating an "aryl nucleus" which hereinafter will include a variety of aromatic compounds, various hydrocarbon and heterocyclic compounds with a silyl acid halide of the formula, (4) 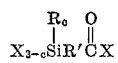

where R, R' and c are as previously defined, and X is a halogen radical such as chloro. Aryl nuclei which can be employed are for example, benzene, naphthylene, anthracene, diphenylether, furan, thiophene, dixylylsulfone, dibenzofuran, carbazole, dibenzothiophene, etc. Certain of the aryl nuclei, for example, benzene, included within the scope of the invention cannot be readily diacylated with the silyl acid halide of Formula 4. In instances where the aryl nucleus cannot be directly diacylated in accordance with the practice of the invention, certain dicarbonyl analogues of the carbonyl-containing organosilicon materials of the invention having units included by the above formulae can be made by an indirect procedure. For example, diacylation of certain aryl nuclei operable in the present invention which normally cannot be diacylated directly, can be effected by initially monoacylating the aryl nucleus with the silyl acid halide of Formula 4. The carbonyl radical is then reduced to methylene with a metal hydride such as lithium aluminum hydride in the presence of aluminum chloride. The resulting product can be acylated again, followed by oxidation of the previously reduced carbonyl radical as described above.

Carboxylic acid halides of Formula 4, and methods for making them are shown by Sommer et al., J.A.C.S. 73, 5130 (1951). Included by the carboxylic acid halide of Formula 4, are beta-trichlorosilylpropionyl chloride, gamma-methyldichlorosilylbutyryl chloride, gamma-phenylmethylchlorosilylbutyryl chloride, etc.

Acylation catalysts that can be utilized to effect reaction between the silyl acid halide of Formula 4, with an aryl nucleus in accordance with the practice of the invention, include for example, aluminum chloride, boron trichloride, zinc chloride, stannic chloride, polyphosphoric acid, etc.

The carbonyl-containing organosilicon polymers consisting essentially of units of Formula 2, or 2 and 3, can be made by hydrolyzing organosilicon materials included by Formula 1, or cohydrolyzing such materials with organohalosilanes of the formula, (5) $R_dSiX_{(4-d)}$ where R, d and X are as defined above. Included by Formula 5 are methyltrichlorosilane, methylphenyldibromosilane, dimethyldichlorosilane, trimethylchlorosilane, methylvinyl dichlorosilane, methylcyanoethyldichlorosilane, etc.

The carbonyl-containing organosilicon polymers of the present invention can be fluids, viscous gums, or resinous solids, depending upon the functionality of the respective chemically combined units. The polymers can be composed of from 2 to 3,000 chemically combined units, while preferably they are composed of from 5 to 500 chemically combined unit. Preferably, the carbonyl-containing polymers of the present invention consist essentially of chemically combined units of the formula, (6) 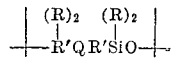

where R, R' and Q are as defined above. Copolymers of 5 to 95 mole percent of units of Formula 6 chemically combined with 95 to 5 mole percent of diorganosiloxy units of the formula, (7) $R_2SiO$ are also included. The aforementioned polymers and copolymers can be silanol chain-stopped, or if desired, chain-stopped with $R_3SiO_{0.5}$ units.

The carbonyl-containing organosilicon polymers consisting essentially of chemically combined units of Formulae 6 and 7 can be compounded with conventional organopolysiloxane elastomer materials such as silica fillers, for example, fumed silica, heat-age additives, plasticizers, pigments, etc. A proportion of from 10 to 300 parts of filler, for example, reinforcing fillers such as silica fillers or mixtures of reinforcing fillers and non-reinforcing fillers such as zinc oxide, diatomaceous earth, etc. can be employed. Cure of the organosilicon polymers consisting of chemically combined units of Formulae 6 and 7 can be effected with conventional room temperature vulcanizing curing agents, such as methyltriacetoxysilane, or curing agents such as organosilicates in combination with a metal soap, such as dibutyltindilaurate, zinc octoate, etc. as taught by Berridge Patent 2,845,541, assigned to the same assignee as the present invention. Peroxide curing catalysts also can be employed such as benzoyl peroxide, dicumyl peroxide, etc.

In the practice of the invention, the carbonyl-containing organosilicon polymers can be made by acylating an aryl nucleus with a silyl acid halide shown by Formula 4 in the presence of a Friedel-Crafts catalyst. The acylation product can then be hydrolyzed to produce a carbonyl-containing organosilicon polymer, or it can be cohydrolyzed with organohalosilanes included by Formula 5.

In many instances, the acylation of the aryl nucleus can be accomplished by standard Friedel-Crafts methods. Experience has shown, however, that a modified Friedel-Crafts procedure must be employed when utilizing a silylalkyl acid halide having less than three carbon atoms between the silicon atom and the carbonyl group. It has been found for example, that a silylalkyl acid halide, for example, a silylpropionyl halide, can decompose when mixed with a Friedel-Crafts catalyst such as an aluminum halide in the absence of the aryl nucleus. In instances where a silyl acid halide such as propionyl halide is used, it is preferred to add the Friedel-Crafts catalyst in small increments to a mixture containing the aryl nucleus and the silyl acid halide. If desired, a suitable organic solvent can be utilized during the acylation of the aryl nucleus to facilitate the acylation reaction. Suitable organic solvents are organic solvents which are substantially inert to the reactants and stable to the conditions employed during the reaction. Suitable organic solvents include for example, methylene chloride, nitrobenzene, carbon disulfide, etc. Temperatures at which acylation of the aryl nucleus can be effected can vary widely. For example, a range of from —50° C. to 150° C. has been found to be operable, while a range of between 30° C. to 100° C. is preferred.

Hydrolysis of the acylated aryl nucleus can be achieved by standard procedures. A dilute aqueous hydrochloric acid solution and ice can be employed directly with the acylation reaction mixture. In instances where the acylated aryl nucleus is free of halogen attached to silicon, such as where the acylated aryl nucleus has organo radicals attached to silicon by carbon-silicon linkages, polymerization of the acylated aryl nucleus can be achieved by initially effecting cleavage of the organo radicals. One procedure that can be used to sever organo radicals from silicon to provide for the formation of carbonyl-containing organo-silicon polymer is sulphuric acid cleavage. Sulphuric acid cleavage can be effected by mixing the acylated aryl nucleus with concentrated sulphuric acid and then hydrolyzing the resulting mixture; the desired carbonyl-containing organo-silicon polymer can be extracted from the resulting hydrolyzate by use of an organic solvent. Recovery and further purification can be achieved with standard procedures such as chromatography, etc.

In forming copolymers of the acylated aryl nucleus and organosiloxy units of Formula 3, cohydrolysis of the acylated aryl nucleus and organohalosilane of Formula 5 can be effected in accordance with conventional procedures. The procedure employed for the hydrolysis of the acylated aryl nucleus also can be utilized for cohydrolyzing the acylated aryl nucleus and organohalosilane.

In order that those skilled in the art will be better able to practice the invention, the following examples are given by way of illustration and not by way of limitation. All parts are by weight.

Example 1

There were added 90 parts of trimethylsilylbutyryl chloride to 84 parts of thiophene. There were then added to the resulting mixture which was maintained under an inert atmosphere and cooled in an ice bath, 130 parts of anhydrous stannic chloride. While the resulting mixture was being stirred, hydrogen chloride was continuously evolved resulting in the formation of deep colored complex. The reaction mixture was allowed to warm to room temperature with stirring, for an additional 3 hours and then it was refluxed. The mixture was then refluxed further for 3 more hours. The mixture was then poured onto 500 parts of ice which was contained in an equal weight of a 5% HCl solution. After the mixture had been hydrolyzed completely, the organic layer was separated, dried and fractionated. There was obtained 70 parts of product having a boiling point between 134° to 137° C. at 1.5 millimeters. The I.R. and N.M.R. spectra of the product showed that it was trimethylsilylbutyryl-2-thiophene.

Trimethylsilylbutyryl-2-thiophene is reduced with an equal molar amount of AlCl₃—LiAlH₄ mixture according to the procedure of Nystrom, J. Am. Chem. Soc. 80 2896 (1958). There is obtained a quantitative yield of trimethylsilylbutylthiophene.

Equimolar amounts of trimethylsilylbutylthiophene and trimethylsilylbutyryl chloride are combined together in methylene chloride solvent. There is added portionwise to the resulting mixture under an inert atmosphere, equimolar amounts of stannic chloride. Hydrogen chloride evolves from the resulting mixture as it is stirred. A colored complex is formed. The mixture is then poured into a mixture of crushed ice and dilute hydrochloric acid to effect hydrolysis. The organic layer is separated, dried and fractionated. Based on method of preparation and its infrared spectrum, the product obtained is α, α'-trimethylsilylbutyl, trimethylsilylbutyrylthiophene, $$(CH_3)_3Si(CH_2)_4(C_4H_3S)\overset{O}{\overset{\|}{C}}(CH_2)_3Si(CH_3)_3$$

There is added 10 parts of the above prepared, α, α'-trimethylsilylbutyl, trimethylsilylbutyrylthiophene to 50 parts of concentrated sulphuric acid. Methane is evolved. Afterwards, the resulting mixture is treated with a 10% sodium carbonate solution to neutralize excess acid. The product is extracted with methylene chloride, then separated and dried. The crude product is then purified by chromatography using a column packed with Alcoa F–20 alumina in hexane. The product is eluted from the column with benzene. Upon stripping a viscous oil is obtained. Based on its method of preparation and its infrared spectrum, the product is a silanol-terminated polymer composed of chemically combined units of the formula,

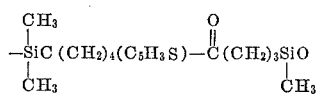

Example 2

There was slowly added 3.5 parts of anhydrous aluminum chloride to a stirred mixture of 2 parts of xanthene and 4.1 parts of beta-trimethylsilylpropionyl chloride in methylene chloride. Hydrogen chloride was continuously evolved during the addition. After the mixture was stirred for an additional 8 hours, it was hydrolyzed. A 50% yield of product was obtained from a hexene-toluene mixture. It was a yellow solid. Based on method of preparation and its infrared spectrum, the yellow solid was bis(beta-trimethylsilylpropionyl)xanthene of the formula,

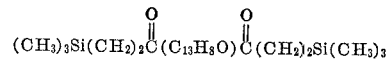

There was added about 0.5 part of the above diketone to 10 parts of concentrated sulphuric acid. During the addition, the resulting mixture was stirred constantly to effect the evolution of methane. Upon hydrolysis, a 40% yield of stringy polymeric material was obtained. The infrared spectrum of the product showed absorption at 3.0 microns and 9.5 microns indicating the presence of silanol and linear siloxane linkages, respectively. Based on method of preparation and infrared spectrum and polymer is a silanol terminated polymer composed of chemically combined units of the formula,

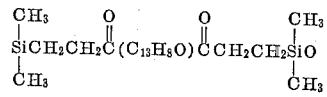

Example 3

There was added 3.5 parts of aluminum chloride to a mixture of 2 parts of xanthene, 4.5 parts of gamma-trimethylsilylbutyryl chloride in methylene chloride in accordance with the procedure of Example 2. There was obtained a white solid (50% yield) melting at about 111°–113° C. Based on its method of preparation and its infrared spectrum, the product was a diketone of the formula,

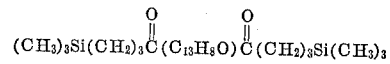

There was added 0.5 part of the above diketone to 10 parts of concentrated sulphuric acid. Following the procedure of Example 2, a polymeric material was obtained which could be drawn into long wispy filaments. The infrared spectrum of the product showed silanol absorption at 3.0 microns and linear siloxane absorption at 9.5 microns. Based on the method of preparation and its infrared spectrum, the material was a silonal-terminated polymer consisting essentially of chemically combined units of the formula,

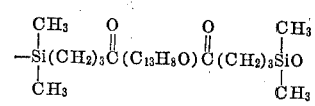

Example 4

There was added over a period of about 30 minutes, 8.5 parts of anhydrous aluminum chloride to a stirred mixture in methylene chloride of 4.15 parts of carbazole and 10 parts of gamma-dimethylchlorosilylbutyryl chloride. The mixture was stirred for about 8 hours during which time HCl was continuously evolved. The mixture was then poured onto a mixture of ice and dilute hydrochloric acid to effect hydrolysis of the complex. The organic layer was separated and stripped of solvent. There was obtained a 50% yield of polymeric material. Based on its method of preparation and its infrared spectrum showing silanol absorption at 3.0 microns, alkylaryl ketone absorption at 6.0 microns, linear siloxane at 9.5 microns, as well as absorption characteristics for the carbazole portion, the product was a silanol-terminated polymer consisting of chemically combined units of the formula,

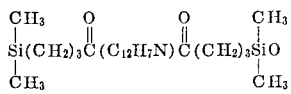

Example 5

There was added 8.5 parts of aluminum chloride to a stirred mixture in methylene chloride of 4.15 parts of dibenzofuran and 10 parts of gamma-dimethylchlorosilylbutyryl chloride. HCl was continuously evolved during the resulting reaction. The mixture was stirred for several hours after which it was hydrolyzed in accordance with the procedure of Example 4. A visious product was obtained. Based on its method of preparation and its infrared spectrum showing absorption at 3.0 microns for terminal silanol, 6.0 microns for alkylaryl ketones, 8.0 microns for methyl-to-silicon, 9.5 microns for linear siloxane, as well as absorption characteristic of dibenzofuran at 6.3 microns and 8.4 microns, the product was a silanol-terminated polymer consisting of chemically combined units of the formula,

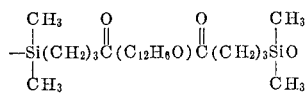

Example 6

There was added with stirring over a period of about 30 minutes, 8.5 parts of anhydrous aluminum chloride to a mixture of 3.2 parts of naphthalene and 10 parts of gamma-dimethylchlorosilylbutyryl chloride in methylene chloride. During and after the addition, HCl was continuously evolved. The mixture was stirred for an additional period of about 8 hours and then hydrolyzed in accordance with the previously described procedure. A 50% yield of viscous oil was obtained by stripping solvent from the organic layer. Based on its method of preparation and its infrared spectrum which showed absroption at 6.4, 9.0, 10.5, 12.7 and 13.4 microns, as well as additional absorption characterizing naphthalene and silanol, the product was a silanol-terminated polymer of the formula,

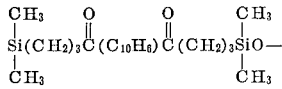

Example 7

In accordance with the procedure of Example 6, there was added 8.5 parts of aluminum chloride to a stirred mixture of 4.25 parts of diphenyl ether and 10 parts of gamma-dimethylchlorosilylbutyryl chloride in methylene chloride. The mixture was stirred for an additional 8 hours and hydrolyzed and worked up to recover the product as above. A viscous, colorless polymeric fluid (54% yield) was obtained. Its infrared spectrum showed absorption bands at 3.0 microns for terminal silanol, 6.0 microns for alkylaryl ketone, and additional absorption bands at 8.0 microns for methyl to silicon, 9.5 microns for linear siloxane, 11.8–12.5 microns for the alkyl-substituted dimethylsiloxy grouping. In addition, the spectrum showed absorption at 3.35, 6.3, 6.8, 8.2 and 11.5 microns which is characteristic of diphenyl ether. The absence of the absorption at 14.4 microns showed acylation of both rings of diphenyl ether. The product therefore was a silanol-terminated polymer consisting of chemically combined units of the formula,

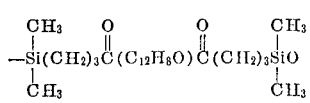

Example 8

There was uniformly added over a 30 minute period, 9 parts of anhydrous aluminum chloride powder to a stirred mixture of 4.25 parts of diphenylether and 11.7 parts of gamma-trimethylsilylbutyryl chloride in methylene chloride. During the addition hydrogen chloride was continuously evolved. The mixture was stirred for an additional 8 hours and refluxed thereafter for 1 hour. The mixture was then allowed to cool to room temperature and it was hydrolyzed utilizing a mixture of chopped ice and dilute hydrochloric acid. The solvent layer was recovered and washed with water, and then neutralized with dilute potassium hydroxide followed again with treatment with water. The solvent layer was then dried with alumina and stripped. The crude product was purified by chromatography in a column packed with Alcoa F-20 alumina in hexane. Elution with diethyl ether resulted in the recovery of a colorless oil whose infrared spectrum showed alkylaryl ketone absorption at 6.0 microns, and organosilicon bands at 8.0 and 11.6–11.9 microns. In addition, the absence of absorption of 14.4 microns showed that both of the aryl rings of diphenyl ether had been acylated. Based on method of preparation and its infrared spectrum, the product was bis(gamma-trimethylsilylbutyrylphenyl) ether

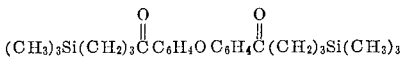

Example 9

In an aluminum cup, 2 parts of the silanol-terminated polymer of Example 3 is thinned out with dry acetone. There is added 0.11 part of tetraethylsilicate hydrolyzate and 0.1 part of stannous octoate. The mixture is thoroughly stirred during the addition. After about 8 hours, the mixture cures to a tack-free elastomer.

This above procedure is repeated, except there is utilized in place of ethylsilicate and stannous octoate, 0.11 part of methylacetoxysilane. Once the acetone has evaporated, the mixture rapidly cures to a tack-free, elastomeric material.

While the foregoing examples show only a few of the carbonyl-containing organosilicon materials of the present invention, it should be understood that the present invention is directed to a much broader class of carbonyl-containing organosilicon materials which can be made by acylating various aryl nuclei previously defined with silyl acid halide of Formula 4 in accordance with the practice of the invention.

What we claim as new and desire to secure by Letters Patent of the United States is:

1. Carbonyl-containing organosilicon materials selected from the class consisting of, (A) polymers consisting essentially of chemically combined units of the formula,

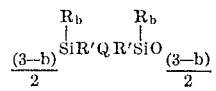

and (B) copolymers of from 0.01 to 99.99 mole percent of organosiloxy units of the formula,

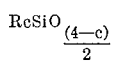

chemically combined with from 99.99 mole percent to 0.01 mole percent of (A) units, where R is a member selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals. Q is a radical selected from the class consisting of

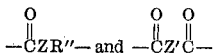

where Z is a member selected from the class consisting of divalent aryl ether radicals, divalent bis(aryl)-sulfone radicals, divalent carbazone radicals, and divalent heteroaromatic radicals, having as the hetero atom a member selected from the class consisting of oxygen, sulfur, phosphorus and nitrogen, Z' is selected from Z radicals, divalent aromatic hydrocarbon radicals and halogenated divalent aromatic hydrocarbon radicals, R'' is an alkylene radical, $b$ is a whole number equal to 0 to 2, inclusive, and $c$ is an integer equal to 0 to 3, inclusive, and the sum of $b$ and $c$ in said copolymers of (B) can have a value of from 1 to 2.5 inclusive.

2. Carbonyl-containing organosilicon materials in accordance with claim 1, in the form of polymers consisting essentially of chemically combined units of the formula,

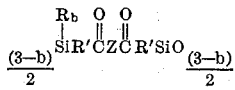

where R is a member selected from the class consisting of monovalent hydrocarbon radicals, halogenated monovalent hydrocarbon radicals, and cyanolkyl radicals, R' is selected from the class consisting of divalent hydrocarbon radicals, and halogenated divalent hydrocarbon radicals, Z is a member selected from the class consisting of divalent aromatic hydrocarbon radicals, halogenated divalent hydrocarbon radicals, divalent aryl ether radicals, divalent bis(aryl)sulfone radicals, divalent aryl carbazone radicals, and divalent heteroaromatic radicals having as the hetero atom a member selected from the class consisting of oxygen, sulfur, phosphorus and nitrogen, and $b$ is a whole number equal to 0 to 2, inclusive.

3. Carbonyl-containing organosilicon materials in accordance with claim 1, in the form of polymers consisting essentially of chemically combined units of the formula,

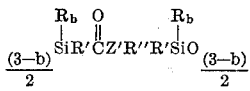

where R is a member selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, R'' is an alkylene radical, and Z' is a member selected from the class consisting of divalent aryl ether radicals, divalent bis(aryl)sulfone radicals, divalent aryl carbazone radicals, and divalent heteroaromatic radicals having as the hetero atom a member selected from the class consisting of oxygen, sulfur, phosphorous and nitrogen, and $b$ is a whole number equal to 0 to 2, inclusive.

4. Organosilicon materials in accordance with claim 1 in the form of copolymers of from 0.01 to 99.99 mole percent of organosiloxy units of the formula,

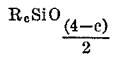

chemically combined with from 99.99 mole percent to 0.01 mole percent of units of the formula,

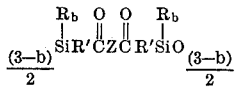

where R is a member selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is a member selected from the class consisting of divalent aromatic hydrocarbon radicals, halogenated divalent hydrocarbon radicals, divalent aryl ether radicals, divalent bis(aryl)sulfone radicals, divalent aryl carbazone radicals, and divalent heteroaromatic radicals having as the hetero atom a member selected from the class consisting of oxygen, sulfur, phosphorous and nitrogen, $b$ is a whole number equal to 0 to 2, inclusive, $c$ is an integer equal to 0 to 3, inclusive, and the sum of $b$ and $c$ can have a value of from 1 to 2.5, inclusive.

5. Organosilicon materials in accordance with claim 1 in the form of copolymers of from 0.01 to 99.99 mole percent of organosiloxy units of the formula,

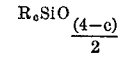

chemically combined with from 99.99 mole percent to 0.01 mole percent of units of the formula,

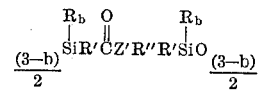

where R is a member selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, R'' is an alkylene radical, Z' is a member selected from the class consisting of divalent aryl ether radicals, divalent bis(aryl)sulfone radicals, divalent aryl carbazone radicals, and divalent heteroaromatic radicals having as the hetero atom a member selected from the class consisting of oxygen, sulfur, phosphorous and nitrogen, $b$ is a whole number equal to 0 to 2, $c$ is an integer equal to 0 to 3, inclusive, and the sum of $b$ and $c$ can have a value of from 1 to 2.5, inclusive.

6. Organosilicon materials in accordance with claim 1 in the form of curable compositions comprising (a) a silanol reactive curing agent in an amount sufficient to effect the room temperature vulcanization of said curable composition, and (b) a silanol chain-stopped polymer consisting essentially of chemically combined units of the formula,

where R is a member selected from the class consisting of monovalent hydrocarbon radicals, halogenated monovalent hydrocarbon radicals and cyanoalkyl radicals, R' is selected from the class consisting of divalent hydrocarbon radicals, and halogenated divalent hydrocarbon radicals, Q is a radical selected from the class consisting of

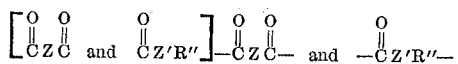

R'' is an alkylene radical, Z is a member selected from the class consisting of divalent aromatic hydrocarbon radicals, halogenated divalent hydrocarbon radicals, divalent aryl ether radicals, divalent bis(aryl)-sulfone radicals, divalent aryl carbazone radicals, and divalent heteroaromatic radicals having as the hetero atom a member selected from the class consisting of oxygen, sulfur, phosphorous and nitrogen, Z' is all of the aforementioned Z radicals except divalent aromatic hydrocarbon radicals and halogenated divalent aromatic hydrocarbon radicals, R'' is an alkylene radical.

7. A composition in accordance with claim 6 where the silanol chain-stopped polymer consists essentially of chemically combined

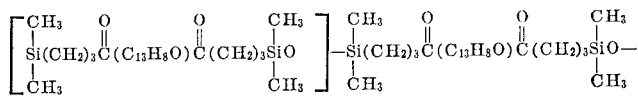

units and the curing agent is methyltriacetoxysilane.

8. Organosilicon materials in accordance with claim 1 in the form of curable compositions comprising (a) a curing agent selected from the class consisting of silanol reactive room temperature vulcanizing catalysts and peroxide curing catalysts in an amount sufficient to effect the cure of said curable composition, and (b) copolymers of from 5 to 95 mode percent of

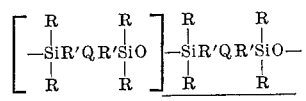

units, chemically combined with from 95 to 5 mole percent of organosiloxy units consisting essentially of $R_2SiO$ units, where R is a member selected from the class consisting of monovalent hydrocarbon radicals, halogenated monovalent hydrocarbon radicals and cyanoalkyl radicals, R' is selected from the class consisting of divalent hydrocarbon radicals, and halogenated divalent hydrocarbon radicals, Q is a radical selected from the class consisting of

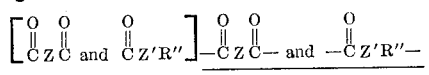

R" is an alkylene radical, Z is a member selected from the class consisting of divalent aromatic hydrocarbon radicals, halogenated divalent hydrocarbon radicals, divalent aryl ether radicals, divalent bis(aryl)sulfone radicals, divalent aryl carbazone radicals, and divalent heteroaromatic radicals having as the hetero atom a member selected from the class consisting of oxygen, sulfur, phosphorous and nitrogen, Z' is all of the aforementioned Z radicals except divalent aromatic hydrocarbon radicals and halogenated divalent hydrocarbon radicals, R" is an alkylene radical.

9. Organosilicon polymers in accordance with claim 1, consisting essentially of chemically combined units of the formula,

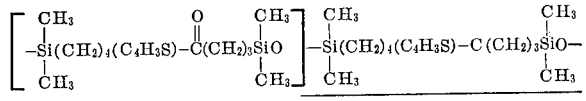

10. Organosilicon polymers in accordance with claim 1, consisting essentially of chemically combined units of the formula,

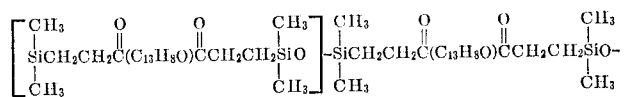

11. Organosilicon polymers in accordance with claim 1, consisting essentially of chemically combined units of the formula,

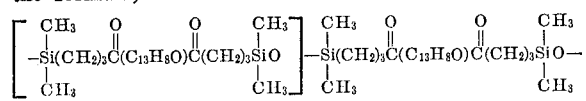

12. Organosilicon polymers in accordance with claim 1, consisting essentially of chemically combined units of the formula,

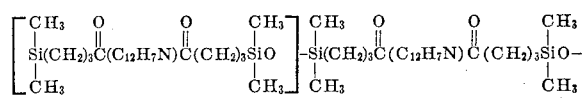

13. Organosilicon polymers in accordance with claim 1, consisting essentially of chemically combined units of the formula,

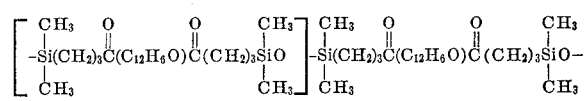

14. Organosilicon polymers in accordance with claim 1, consisting essentially of chemically combined units of the formula,

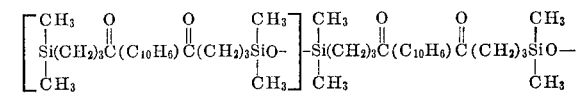

15. Organosilicon polymers in accordance with claim 1, consisting essentially of chemically combined units of the formula,

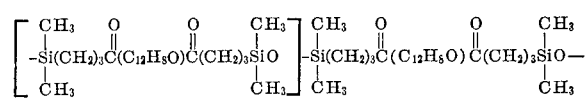

16. Carbonyl-containing organosilicon materials of the formula,

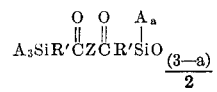

where A is selected from the class consisting of hydrogen, monovalent hydrocarbon radicals, halogenated monovalent hydrocarbon radicals, cyanoalkyl radicals, halogen radicals and alkoxy radicals, R' is selected from the class consisting of divalent hydrocarbon radicals, and halogenated divalent hydrocarbon radicals, Z is a member selected from the class consisting of divalent aromatic hydrocarbon radicals, halogenated divalent hydrocarbon radicals, divalent aryl ether radicals, divalent bis(aryl) sulfone radicals, divalent aryl carbazone radicals, and divalent heteroaromatic radicals having as the hetero atom a member selected from the class consisting of oxygen, sulfur, phosphorous and nitrogen, and $a$ is an integer equal to 2 or 3.

17. Carbonyl-containing organosilicon materials of the formula,

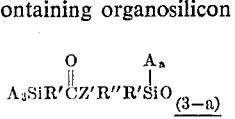

where A is selected from the class consisting of hydrogen, monovalent hydrocarbon radicals, halogenated monovalent hydrocarbon radicals, cyanoalkyl radicals, halogen radicals and alkoxy radicals, R' is selected from the class consisting of divalent hydrocarbon radicals, and halogenated divalent hydrocarbon radicals, R'' is an alkylene radical, and Z' is a member selected from the class consisting of divalent aryl ether radicals, divalent bis(aryl)sulfone radicals, divalent aryl carbazone radicals, and divalent heteroaromatic radicals having as the hetero atom a member selected from the class consisting of oxygen, sulfur, phosphorous and nitrogen, and $a$ is an integer equal to 2 or 3.

18. Carbonyl-containing organosilicon materials in the form of compositions comprising,
(A) a silanol reactive room temperature vulcanizing curing agent in an amount sufficient to effect the room temperature vulcanization of said curable composition, and
(B) a silanol chain-stopped polymer selected from the class consisting of
(i) homopolymers consisting essentially of chemically combined

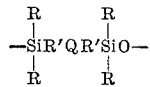

units, and
(ii) copolymers of from 5 to 95 mole percent of (i) units chemically combined with units from 95 to 5 mole percent of organosiloxy units consisting essentially of $R_2SiO$ units, where R is a member selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Q is a radical selected from the class consisting of

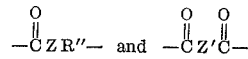

where Z is a member selected from the class consisting of divalent aryl ether radicals, divalent bis(aryl)-sulfone radicals, divalent carbazone radicals, and divalent heteroaromatic radicals, having as the hetero atom a member selected from the class consisting of oxygen, sulfur, phosphorus and nitrogen, Z' is selected from Z radicals, divalent aromatic hydrocarbon radicals, and halogenated divalent aromatic hydrocarbon radicals, and R'' is an alkylene radical.

References Cited
UNITED STATES PATENTS
3,301,817  1/1967  Wilkus et al. _____ 260—46.5

DONALD E. CZAJA, *Primary Examiner.*

M. I. MARQUIS, *Assistant Examiner.*